Figure 1:
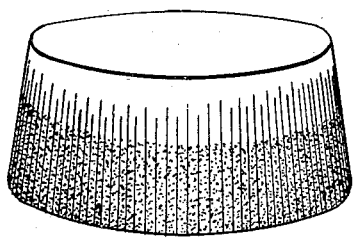

Jan. 8, 1935.　　　　　C. ELLIS　　　　　1,987,288
SEALED MILK BOTTLE AND SEALING MEANS THEREFOR

Filed May 4, 1925

Inventor
Carleton Ellis

Patented Jan. 8, 1935

1,987,288

UNITED STATES PATENT OFFICE 1,987,288

SEALED MILK BOTTLE AND SEALING MEANS THEREFOR

Carleton Ellis, Montclair, N. J., assignor to Ellis-Foster Company, a corporation of New Jersey Application May 4, 1925, Serial No. 27,997

24 Claims. (Cl. 215—38)

This invention relates to paper hood caps for milk bottles and to bottles capped therewith.

The usual method of fastening hood caps on milk bottles is by means of a wire ring which clamps the crimped portion or skirt of the cap to the sides of the bottle below the mouth flange.

Hood caps which have a sufficient length of skirt to extend well below the mouth flange may be used in accordance with the present invention but preferably I employ caps the crimped portion of which is somewhat shorter and when on the bottle extend barely below the mouth flange. A cap of this character presents a neat appearance and the amount of paper stock employed in making such caps is reduced.

In the present invention wire rings or metallic clamps are not used. The cap is impregnated or coated, or both impregnated and coated, either throughout or over a portion of the crimped area, with a sealing agent having a mild adhesion to glass. Preferably I employ a wax which is substantially non-adhesive to glass in conjunction with a saponifiable adhesive agent.

Thus I may employ hard waxes such as carnauba, candelilla, Montan and shellac wax and the like having relatively high melting points, for example above 70° C. and preferably above 75° or 80° C.

When these hard waxes are melted and poured on glass in a thin layer it will be found on cooling that the wax peels or separates readily from the glass as for example by gentle abrasion with the finger nail. This is a desirable quality to a certain degree in that it prevents fouling of the milk bottles through adhesion of the wax. The effect is quite different with softer and unsaponifiable waxes such as paraffin which when melted and poured on glass adheres rather tenaciously. Waxes of this character tend to foul the bottles.

On the other hand a hood cap carrying a binder of the aforesaid high melting point waxes not infrequently has too little adhesion and on slight swelling of the cap which may come from absorption of moisture from water or ice the cap may loosen sufficiently to be easily rotated around the mouth of the bottle. This would not be a particular objection if the rotation which may occur in handling did not have a tendency to cause the cap to spread by sliding upward slightly along the mouth flange. Caps which spread in this manner give the appearance that the contents of the bottle have been tampered with.

In the present invention I incorporate with the high melting point wax having peeling properties, an adhesive substance such as dammar resin, copal or common rosin; the latter being very cheap and satisfactory.

Cumaron resin might be used but would have the disadvantage of being unsaponifiable and therefore should particles of the binder adhere to the glass the hot soda ash solution used in washing the bottles in the dairy might not remove all the binding composition from the surface of the glass. Resin of this character is not recommended for the purpose but its use in some mixtures may be possible and is not precluded. The adhesive agent may be incorporated with the wax to the extent of 10 or 20 per cent or even in larger proportions depending on the degree of adhesion desired. A resinous body such as rosin or shellac both of which are very readily soluble in hot soda ash solutions has the advantage that if present in binder compositions they afford an emulsifying or disintegrating action when subjected to the hot alkaline solution and particles of the binder sticking to the bottle therefore are removed in a relatively easy manner.

The resin and wax may be melted together to form the requisite mixture. In some cases for example when using shellac which is not readily miscible with some waxes, blending agents may be required.

Metallo organic compounds of the waxes and resins likewise may be used or the mixture of wax and resin may be treated with a small amount of base such as calcium or magnesium oxide or hydroxide to raise the melting point. Usually 2 or 3 per cent of the basic material suffices.

Such metallo organic compounds preferably and desirably are made by fusion rather than by precipitation, in order to save expense and avoid impurities which may be present when made by a wet method or precipitation procedures.

The hood cap is usually made of stiff strong paper but other grades of paper or special fibrous material may be employed. The paper should be treated with a lubricating substance in order that it may be drawn, that is forced through dies to obtain the desired cup or ramekin shape. One or both sides of the paper therefore may have a coating of paraffin wax or other lubricating agent applied thereto prior to drawing. A desirable treatment proposed especially to be carried out in connection with the present invention is that of incorporating with the paper stock while in the beater engine a quantity of a paraffin wax emulsion and adding a setting agent which causes the paraffin to precipitate throughout the particles of the pulp mass. Thus 2 or 3 per cent by weight of the paper stock may be introduced in this manner for waterproofing purposes and larger proportions may be added to secure a lubricating effect to accomplish drawing to advantage. Such emulsions of wax may be made by agitating or grinding paraffin wax with water, bentonite and a small amount of soap or alkali, or starch and caustic soda may be employed with the paraffin wax, or 5 or 10 per cent of stearic or oleic acid may be melted with the paraffin and this composition emulsified with a hot dilute aqueous solution of caustic soda or ammonia. Preferably the paraffin emulsion is added to the beater engine at the time the paper stock is charged thereinto and after thorough admixing in the usual manner, with or without the addition of rosin size or any other desired sizing agent, alum, or other setting agent is added just before the charge is withdrawn.

The paper which is waterproofed in this way also may be cut into discs of a size appropriate to fit into the mouths of milk bottles so as to form a closure for the bottles. Ordinarily discs of this character are waterproofed by applying to both surfaces a thin coating of paraffin wax. In the present case the wax is distributed through the mass of paper instead of being at the surface and a less greasy effect may be obtained with economy of wax.

The present invention contemplates a bottle which is stoppered or closed by means of a paper disc containing paraffin emulsion as aforesaid and carrying a protecting hood cap preferably likewise waterproofed.

Figure 2:
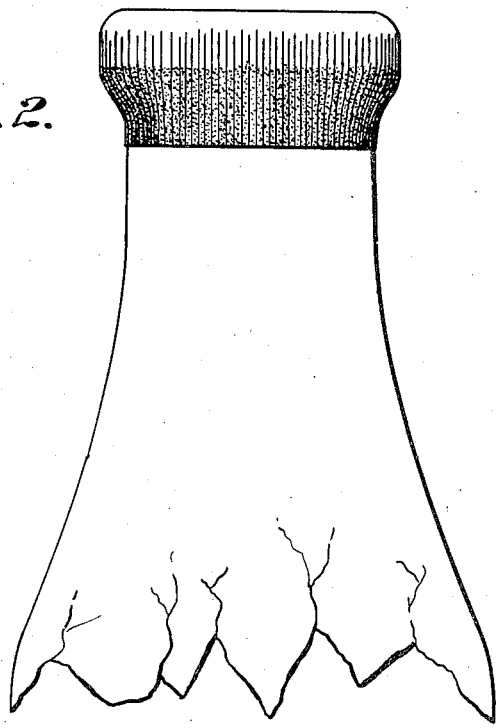

In the drawing there is shown by way of illustration, in Figure 1, a hood cap carrying a binder; and in Figure 2, the hood cap of Figure 1 crimped on a bottle.

By applying paraffin wax in the paper in this manner the drawing operation may be carried out without having the surface of the paper saturated with wax, so that the binding wax described above when applied to the skirt of the cap does not become contaminated or diluted with objectionable amounts of paraffin.

The binding wax and resin composition may be applied to the hood cap by dipping the lower part of the cap in the molten mixture, or the caps may be nested and a column of such nested caps arranged with the skirts pointing downward. The molten composition is poured over the caps and a portion of the wax collects on the exposed lower part of the skirt of each cap. Or the molten composition may be applied by spraying or in other ways.

In applying the caps to bottles the column of nested caps carrying the binding agent may be placed in a vertical container open at the bottom and provided with suitable means for removing one cap at a time and placing it on a bottle set just beneath the device. This vertical container is preferably jacketed and is heated by steam or by steam blown into water contained in the bath. In some cases when special temperatures are desired the baths may contain solvents such as alcohol or toluol with reflux condenser equipment so that on applying heat which ordinarily will be from the steam plant of dairy, the caps will not be heated above a certain desired temperature.

A quick-setting composition as the binding agent is important in most cases because the capping of the bottles is carried out by machinery which is more or less automatic and the time allotted for the binding agent to set therefore may be only a few seconds. Preferably therefore the binding agent is maintained at a temperature slightly above the softening or congealing point. Some mixtures have so pronounced a lack in setting or hardening by cooling, especially when heated considerably above the melting point that much trouble arises in securing sufficient rapidity of set to allow their use in dairy practice. By arranging to have the temperature of the heating bath at a definite relatively low point close to the softening or congealing point as aforesaid the rate of setting usually is substantially increased. With larger proportions of resins which have less definite softening points this condition may be aggravated and preferably I employ a proportion of resin or resinate less in amount than the wax, that is the composition contains a major proportion of wax.

Various other substances may be employed in carrying out the present invention in replacement of the waxes in whole or in part or in substitution for the resins or resinates, and when the color is not objectionable asphaltic substances such as gilsonite or other dark materials or coloring agents may be introduced. Metallo organic compounds such as magnesium or calcium stearate, palmitate and the like also may be incorporated.

In the case of the latter addition mentioned I prefer to use products made by fusion rather than by precipitation as in this manner magnesium or calcium stearate or palmitate may be very cheaply obtained in a state of purity or at least free from saline compounds or other substances which might accidentally contaminate the contents of the bottle.

While paraffin wax by itself has the disadvantages set forth above, a considerable improvement results on mixing it with rosin. For example a mixture of equal parts of rosin and paraffin melted together and applied to the skirt of the hood cap was found to be very waterproof and although there was some fouling of the glass the attached particles could be removed by washing; due no doubt to the emulsifying character of the rosin intimately mixed with the wax. A mixture of 1 part of rosin to 3 parts of paraffin was removed from glass with greater difficulty.

A mixture of equal parts of cumaron resin, rosin and paraffin likewise did not offer difficulty of removal by washing with alkaline solutions. Congo resin 1 part, rosin 3 parts and paraffin wax 1 part was yellow in color and did not foul glass.

A mixture of 5 parts rosin, 5 parts paraffin wax and 1 part of carnauba wax was found, like the foregoing to have a desirable cling or mild adhesion to glass but did not foul it. The composition flaked off from glass on moderate pressure. Such a composition I consider superior to one composed largely or entirely of carnauba wax because of the slight cling without fouling and because the cost of materials is so much less.

The foregoing examples have the desired cling preventing rotation of the cap on the flange of the bottle on mild pressure, especially when a sufficient amount of the binder is present. With respect to this proportion it may be noted that the paper may be simply impregnated with the composition or a larger amount may be employed so as to have a coating on the surface. The latter is desirable especially since the single-ply paper preferably employed in forming the cap when light in weight does not absorb enough of the binder on impregnation alone to make a firm seal in all cases. With heavier and more expensive paper this criticism may not apply. However if the composition is not fouling it does not matter if an excess of the composition above that absorbed by the paper is present. Such additional amount of binder increases the strength and firmness with which the cap is attached to the bottle.

The present invention therefore contemplates the employment of binders comprising rosin or other resin of an appropriate character incorporated with a soft wax such as paraffin and preferably with a modifying wax such as carnauba. The proportions given above are useful ones since the mixture is low in cost and has the desired properties. The carnauba wax may however be increased to secure a greater peeling effect. The rosin and paraffin may be varied, for example twice as much rosin as paraffin may be employed. It is a matter of surprise that paraffin wax which normally adheres to bottles in the manner indicated above, causing various difficulties, loses this property to a very considerable extent when incorporated with the rosin, particularly on the addition of a small amount of a high melting point wax such as carnauba. The color of the mixture is satisfactory and the paper when thoroughly impregnated and slightly coated acquires a glossy finish. While the rosin and paraffin by themselves do not give satisfactory results, when admixed as above and used as a binder for a single ply hood cap excellent waterproofing results are obtained.

Hood caps impregnated with carnauba wax alone as the binding agent or various other high melting point waxes are not particularly waterproof. Milk bottles are frequently packed in ice or handled under conditions of moisture which are severe, the bottles oftentimes being actually submerged. When so submerged hood caps having carnauba wax as the binding agent will swell and loosen in the course of an hour or two. Sometimes the caps will loosen to such an extent that they will separate from the bottle and float on the surface. With a rosin-paraffin-carnauba mixture in the proportion stated above a hood cap the skirt of which has been impregnated and coated therewith may be submerged under water for a period of 12 hours or more without any material loosening of the skirt. This too despite the fact that the upper part of the cap over the top of the bottle which has had merely the usual glaze of paraffin wax will be in a soft and swollen condition.

By impregnating the entire cap with the rosin-paraffin-carnauba mixture a remarkably complete waterproofing effect results and the caps are especially permanent. In this case however it is better to use a larger proportion of carnauba wax than 5 or 10 per cent, preferably increasing to 20 or 30 per cent.

Other compositions are equal parts of dammar resin and paraffin wax; Congo resin 1 part, rosin 3 parts, paraffin wax 3 parts; Congo resin 1 part, rosin 2 parts, paraffin wax 1 part; asphalt 2 parts, rosin 2 parts, paraffin wax 5 parts. The latter is black in color, rather slow setting and tends to foul glass slightly. A mixture of equal parts cumaron resin and paraffin wax was weaker.

The proportions given above are by weight. The hood caps in question it should be understood are made from a single sheet of paper, that is they are not composed of two or more sheets of paper cemented together. Such a single ply cap is cheaper to make and the manufacturing difficulties connected with producing it are considerably less than with caps made with a plurality of layers of paper. A good strong type of paper heavy enough to stand handling incident to transporting milk bottles should be used. It may be glazed with paraffin as heretofore employed in making the paper discs for closing milk bottles, or it may be waterproofed with emulsified wax as described above. A hood cap made with paper containing such emulsified wax may be referred to as waterproofed with or containing emulsified wax or wax which has been deposited from an emulsion by the employment of a suitable coagulating agent; such coagulation or setting preferably being carried out in the beater engine. A large part of the paper stock of the hood cap preferably is ground wood which may be admixed with wood pulp obtained by the sulphite or other processes. By employing a hood cap, the paper stock of which contains a considerable proportion of ground wood and impregnating a portion of the skirt or crimped part of the cap with the rosin-paraffin-carnauba wax mixtures aforesaid, it is possible to employ a comparatively short skirt which reaches only around the flange of the bottle and yet which when crimped into place has a strength and adhesion which could be secured with for example carnauba wax alone only by employing a much longer skirted portion.

Thus the invention in its preferred form relates to a hood cap carrying a skirt-binder comprising a resin and waxy material, the latter preferably being a mixture of a cheap soft wax such as paraffin and a high melting point or hard wax such as carnauba; the latter being present in a proportion sufficient to substantially reduce adhesion to glass; there being however preferably sufficient adhesion to obtain a strong sealing effect when the hood cap with its binder softened by heat is crimped around the mouth of the bottle. There is thus involved the process which comprises melting together a resin which has the property of clinging to glass and a high melting point wax which has the property of readily peeling from glass, the ratio of the resin and wax being in predetermined proportions to adjust the degree of cling and applying such composition to hood caps as a binding agent. Furthermore the invention comprises a milk bottle capped as aforesaid especially with a hood cap having a relatively short skirt reaching only to or just below the flange of the milk bottle; the length being preferably only sufficient to engage the jaws of the clamp when the cap is applied.

When water insoluble soaps or resinates are employed it should be noted that I prefer to employ products which have been made by fusion rather than precipitation in the wet way. By the latter procedure, which by the way is a relatively costly one, the coagulum is likely to occlude impurities such as the salts formed during the reaction. Preferably I employ stearates, palmitates, oleates, resinates and the like which have been made simply by fusion rather than by precipitation and thus avoid the presence in the caps of "chemicals" liable to cause suspicions on the part of laymen or of allegations by hostile interests.

Finally it may be noted that paraffin wax is extremely slow setting when employed alone, that it is rather greasy and exhibits a considerable degree of adhesion to glass. Rosin on the other hand sets fairly rapidly and is notably adhesive and sticky. Carnauba wax sets quickly and is substantially non-adhesive. It is surprising to find that the sticky qualities of rosin and the slow setting properties of paraffin wax are so considerably modified by their action one on the other and that carnauba or other high melting point waxes even in the small proportion of 10 per cent or thereabouts introduced into the mixture of rosin and paraffin exhibits such an unexpected behavior so that when used as a skirt-binder mild adhesion, substantial absence of greasiness, quick setting, strong binding effects and excellent water resistance result.

In using the term paper seal or binding agent it should be understood that it is not my purpose necessarily to hermetically seal the milk bottle. I desire to secure on the mouth of the bottle a cap which will prevent for all practical purposes, during the period that the bottle is exposed, the ingress of dust or impurities, also to make it difficult to tamper with the bottle without detection. Preferably therefore I do not use so abundant a coating of binder, nor paper of such a soft, yielding character that a hermetic seal results. The fluted or crimped portion of the cap or skirted part being made preferably of rather stiff strong paper ordinarily will permit the passage of air through various small openings along the sides of the skirt between it and the bottle. The employment of a coating adequate to give sufficient strength as a binder for the skirt but not sufficient to cement the entire skirt in an air-tight manner to the glass renders the bottle more readily cleaned. In any event it is preferable to impregnate solely the skirt of the hood cap or merely a part of said skirt when economy of material is desired. In such a case the upper part of the cap as it rests on the upright bottle will be more or less easily permeable by air and a hermetic seal does not therefore result.

What I claim is:—

1. A hood cap carrying a composition binder containing a component having peeling properties and a component having non-fouling adhesion producing properties.

2. A milk bottle single-ply hood cap carrying a binder comprising resin and wax.

3. A hood cap carrying a skirt-binder comprising a resin, a soft wax, and a hard wax.

4. A hood cap carrying a binder of high melting point wax and a saponifiable resin.

5. A hood cap carrying a skirt-binder comprising resin, a soft wax and a hard wax; the latter present in a proportion sufficient to substantially reduce adhesion to glass.

6. A hood cap carrying a skirt-binder comprising approximately 1 part of carnauba wax to 10 parts of a mixture of equal parts rosin and paraffin wax.

7. A hood cap carrying a skirt-binder comprising a soft wax, and at least an equal proportion of a resin.

8. A skirted hood cap carrying a skirt-binder comprising a hard wax and a resin.

9. A hood cap made of paper carrying paraffin wax introduced into the paper from an emulsified condition said cap having a binder comprising a high melting point wax.

10. A paper hood cap made from paper containing wax introduced in emulsified condition with the paper stock in the condition of pulp.

11. A paper hood cap made from paper containing paraffin wax introduced in emulsified condition with the paper stock in the condition of pulp.

12. A skirted hood cap carrying a binder composition on the skirt thereof, said cap being made of paper carrying paraffin wax introduced into the paper from an emulsified condition.

13. A milk bottle protected by a hood cap of the character set forth in claim 1.

14. A bottle protected by a hood cap of the character set forth in claim 2.

15. A container protected by a hood cap carrying a binder comprising a crystallizable substance, and an amorphous substance tending to inhibit crystallization.

16. A bottle protected by a hood cap carrying a binder containing rosin and carnauba wax, the rosin being present in an amount comprising at least 50% of the composition.

17. A single-ply paper skirted cover for covering the disc stopper and mouth rim of a milk bottle, said cover carrying a binder of a quick setting wax and resin mixture, substantially devoid of filling material.

18. A hood cap carrying a skirt binder comprising a resinous adhesive agent and a high melting point wax serving as an adjuster of adhesion.

19. A hood cap made of paper stock containing a considerable proportion of ground wood, said cap carrying a binder including wax and resin.

20. A hood cap made of paper stock containing a considerable proportion of ground wood, said stock including paraffin wax deposited from an emulsion containing the same.

21. A hood cap carrying a skirt binder comprising rosin, a soft wax and a hard wax, the latter present in proportion sufficient to substantially reduce adhesion to glass.

22. A hood cap carrying a skirt binder comprising rosin, paraffin wax and carnauba wax.

23. A milk bottle protected by a hood cap carrying a binder comprising a high melting point wax and a resinous adhesive agent.

24. A paper material hood cap, for application to container heads, the skirt of which will strip or peel from glass surfaces without fouling the same, said skirt carrying a binder that embodies a hard high-melting point ingredient that is substantially non-adhesive on glass, a rosin, and paraffin.

CARLETON ELLIS.